United States Patent
Haas et al.

[11] 3,952,193
[45] Apr. 20, 1976

[54] IMAGING METHOD WITH U.V. EXCITATION OF LIQUID CRYSTAL

[75] Inventors: Werner E. L. Haas, Webster; James E. Adams, Ontario, both of N.Y.

[73] Assignee: Xerox Corporation, Stamford, Conn.

[22] Filed: Sept. 25, 1974

[21] Appl. No.: 509,151

[52] U.S. Cl.............................. 250/331; 250/372; 350/160 LC
[51] Int. Cl.² ...................... H01J 31/49; G02B 5/23
[58] Field of Search .......... 250/331, 372, 461, 474; 350/160 LC, 160 R

[56] References Cited
UNITED STATES PATENTS

| | | |
|---|---|---|
| 3,114,836 | 12/1963 | Fergason et al. .................... 250/331 |
| 3,401,262 | 9/1968 | Fergason et al. .................... 250/331 |
| 3,732,429 | 5/1973 | Bravnstein et al. .................. 250/331 |
| 3,767,289 | 10/1973 | Aviram et al. .................. 350/16 DR |
| 3,789,225 | 1/1974 | Leder.................... 250/372 |
| 3,803,408 | 4/1974 | Assouline et al. .................. 250/331 |
| 3,824,002 | 7/1974 | Beard .......................... 350/160 LC |
| 3,842,275 | 10/1974 | Haas .................... 250/331 |

*Primary Examiner*—Harold A. Dixon
*Attorney, Agent, or Firm*—James J. Ralabate; Michael H. Shanahan; George J. Cannon

[57] ABSTRACT

The electrical resistivity of pure trans-stilbene nematic liquid crystalline materials is altered by exposure to ultraviolet radiation. These stilbenes can therefore be made to dynamically scatter uniformly or in imagewise configuration and can be added to liquid crystalline compositions to alter the compositions' resistivities.

22 Claims, 2 Drawing Figures

U.S. Patent  April 20, 1976  3,952,193 ns. The molecules of nematic

IMAGING METHOD WITH U.V. EXCITATION OF LIQUID CRYSTAL

BACKGROUND OF THE INVENTION

This invention relates to the imagewise dynamic scattering of nematic liquid crystalline compositions; and, more particularly, to the successful dynamic scattering of trans-stilbenes.

Many nematic liquid crystalline materials are known to exhibit dynamic scattering. Dynamic scattering is generally observed in many nematic liquid crystalline materials upon application of an electrical field of sufficient strength to cause disruption of the alignment order of the nematic molecules and the resultant creation of relatively large regions of turbulence. See "Further Studies of the Dynamic Scattering Mode in Nematic Liquid Crystals", Heilmeier et al, IEEE Transactions on Electron Devices, Vol. ED-17, No. 1, Jan. 1970.

Without being under the influence of an aligning agent or an electrical field, the molecules of nematic liquid crystalline materials in any local area of the nematic liquid crystalline material point in one direction although the orientation differs from area to area.

Upon application of an electrical field across a layer of nematic liquid crystalline material, the molecules of the nematic line up with their long axes at some predetermined relationship to the field direction. When the electrical field is of sufficient strength to cause ions to move towards the electrodes by which the electrical field is applied, the ions disrupt the order of alignment of the nematic molecules and create relatively large regions of turbulence. Dynamic scattering of light results.

Dynamic scattering of trans-stilbene nematic liquid crystalline materials can not be achieved due to the large resistivities of the trans-stilbene materials.

It has been known that stilbenes exhibit "photosensitivity" in that in the presence of light these tended to decompose, and in the simultaneous presence of light and oxygen, phenantrene is formed. See, for example, U.S. Pat. No. 3,767,289.

In the liquid crystalline art, however, the high resistivity of nematic stilbenes have typically been modified, as in U.S. Pat. No. 3,767,289, by the addition of dopants. For example, ether complex salts have been used. I. Haller and G. Gladstone, Fourth International Liquid Crystal Conference, Kent, Ohio, Aug. 21–25, 1972.

U.S. Pat. No. 3,655,971 discloses exposure of liquid crystalline materials to ultra-violet radiation for imaging and without the application of voltage.

In new and growing areas of technology such as liquid crystal imaging, new methods, apparatus, compositions, and articles of manufacture are often discovered for the application of the new technology in a new mode. The present invention relates to a novel method of dynamically scattering pure trans-stilbene nematic liquid crystalline materials.

SUMMARY OF THE INVENTION

It is, therefore, an object of this invention to provide for the successful dynamic scattering of pure trans-stilbene nematic liquid crystalline compositions without the addition of materials such as dopants thereto.

It is another object of this invention to provide a novel imaging method.

It is a further object of this invention to provide a novel method of optically imaging pure trans-stilbene nematic liquid crystalline compositions.

The foregoing objects and others are accomplished in accordance with this invention by irradiating pure trans-stilbene nematic liquid crystalline compositions with ultra-violet radiation in order to decrease the electrical resistivity thereof to a level which renders the pure trans-stilbene nematic liquid crystalline composition susceptible to dynamic scattering.

BRIEF DESCRIPTION OF THE DRAWINGS

For a better understanding of the invention, as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Figure 1:
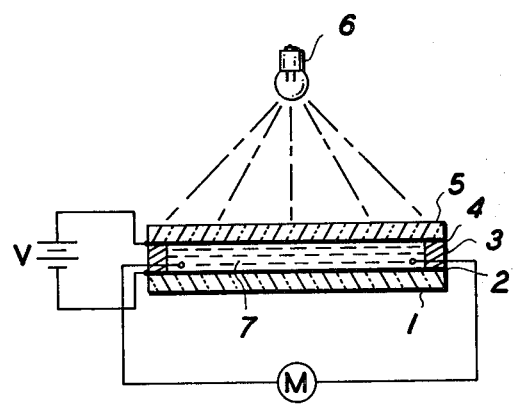
FIG. 1 is a schematic illustration of an embodiment of the invention.

Referring now to FIG. 1, there is seen an imaging member comprising substrates 1 and 5 provided with conductive coatings 2 and 4 to form electrodes. A layer 7 of pure nematic liquid crystalline composition comprising a pure trans-stilbene compound is sandwiched between conductive coatings 2 and 4 and retained by spacer 3. Ultra-violet radiation from radiation source 6 impinges layer 7 and reduces the electrical resistivity thereof to a level which renders layer 7 susceptible to dynamic scattering under the influence of a D.C. voltage provided by voltage source V. A suitable meter such as, for example, a conductance or resistivity meter is electrically connected to layer 7 and measures the conductance or resistivity of the nematic liquid crystalline composition.

"Pure" is used herein to mean that the trans-stilbene nematic or resulting liquid crystalline composition lacks sufficient charge carriers to exhibit dynamic scattering (absent ultra-violet irradiation) at the voltage level applied to successfully produce dynamic scattering subsequent to ultra-violet irradiation.

The electrodes comprising substrates 1 and 5 with conductive coatings 2 and 4, respectively, can be made of any suitable transparent material. Substrates 1 and 5 can be made of glass quartz or plastic or other materials which are substantially transparent. Conductive coatings 2 and 4 can comprise any typical suitable transparent, conductive coatings such as, for example, tin, indium oxide, aluminum, chromium, tin oxide, or any other suitable conductor. These substantially transparent conductive coatings are typically evaporated onto the more insulating transparent substrates. NESA glass, a tin oxide coated glass manufactured by the Pittsburgh Plate Glass Co., is a commercially available example of a typical transparent conductive electrode comprising a substrate and a conductive coating.

Spacer 3 separates the electrodes and contains the nematic liquid crystalline composition between the electrodes. Spacer 3 is typically chemically inert, transparent, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate, and mixtures thereof.

Layer 7 of nematic liquid crystalline composition comprising a pure trans-stilbene may comprise only the nematic trans-stilbene or mixtures thereof, or can comprise any pure composition of any typical suitable material added to the trans-stilbene wherein the trans-stilbene is any part of the composition. Examples of the latter composition include, for example, the addition of optically active materials, whether mesomorphic or not; and other nematic liquid crystalline materials, to the trans-stilbene nematic liquid crystalline material. The trans-stilbene may be added to any liquid crystalline composition for resistivity control. These materials to be added are also pure as defined hereinabove. Typical suitable nematics which can be added to the trans-stilbene include: p-axoxyanisole, p-azoxyphenetole, p-butoxybenzoic acid, p-methoxy-cinnamic acid, butyl-p-anisylidene-p-aminocinnamate, anisylidene para-aminophenylacetate, p-ethoxy-benzylamino-a-methyl-cinnamic acid, 1,4-bis(p-ethoxy benzylidene) cyclohexanone, 4,4'-dihexyl-oxybenzene, 4,4'-diheptyloxybenzene, anisal-p-amino-azo-benzene, anisaldiazine, a-benzeneazo-(anisal-α'-naphthylamine), n,n'-nonaxybenzyltolnidine; anils of the generic group (p-n-alkoxybenzylidene-p-n-alkylanilines), such as p-methoxybenzylidene-p-n-butylaniline; nematic compounds of the alkoxybenzylidene-aminoalkylphenone group, such as methoxybenzylidene-aminobutyrophenone and methoxybenzylidene-aminovalerophenone; mixtures of the above and others.

Typical suitable non-mesomorphic optically active materials to be added to the host trans-stilbene nematic liquid crystalline material include: derivatives of alcohol such as l-menthol, l-linanol, d-mannitol, d-borneol and d-quercitol; derivatives of ketones such as d-camphor, d-3-methylcyclohexanone, l-methone and 1-6-isopropyl-3-cyclohexanone; derivatives of carboxylic acids such as d-citronellic acid, l-citronellic acid, d-chaulmoogric acid, l-campholic acid, l-arabonic acid, d-tartaric acid, and l-ascorbic acid; derivatives of aldehyde such as d-citronellal; derivatives of alkenes such as 1-B-pinane, d-dilvesterene, and derivatives of nitriles such as d-mandelonitrile; derivatives of amides such as d-hydrocarbamide; and mixtures thereof.

Typical suitable mesomorphic optically active materials include liquid crystalline optically active materials such as cholesteric liquid crystalline materials. Typical suitable cholesteric liquid crystalline materials include derivatives from reactions of cholesterol and inorganic acids; for example, cholesteryl chloride, cholesteryl bromide, cholesteryl iodide, cholesteryl nitrate; esters derived from reactions of cholesteryl and carboxylic acids; for example, cholesteryl crotonate; cholesteryl nonanoate; cholesteryl hexanoate; cholesteryl formate; cholesteryl chloroformate; cholesteryl propionate; cholesteryl acetate, cholesteryl valerate; cholesteryl linolate; cholesteryl linolenate; cholesteryl oleate; cholesteryl erucate; cholesteryl butyrate; cholesteryl caprate; cholesteryl laurate; cholesteryl myristate; ethers of cholesterol such as cholesteryl decyl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl heptyl carbamate; and alkyl amides and aliphatic secondary amines derived from $3\beta$-amino-$\Delta^5$-cholestene and mixtures thereof; peptides such as poly-α-benzyl-l-glutamate; derivatives of beta sitosterol such as sitosterol chloride; and active amyl ester of cyano benzylidene amino cinnamate. The alkyl groups in said compounds are typically saturated or unsaturated fatty acids, or alcohols, having less than about 25 carbon atoms and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

Layer 7 of nematic liquid crystalline compositions comprising any of the aforementioned combination of materials can be prepared in organic solvents such as chloroform, petroleum ether, methylethyl ketone and others, which are typically subsequently evaporated from the mixtures thereby leaving the liquid crystalline composition.

Typical suitable trans-stilbene nematic liquid crystalline materials include: 4-methoxy-4'-n-octyloxy-$\beta$-methyl-trans-stilbene, 4-n-butoxy-4'-butoxy-$\alpha$-methyl-trans-stilbene; 4-methoxy-4'-n-octyloxy-$\beta$-chloro-trans-stilbene; 4-ethoxy-4'-n-butyl-$\beta$-methyl-trans-stilbene; 4-ethoxy-4'-n-butyl-$\alpha$-methyl-trans-stilbene; 4-ethoxy-4'-n-pentyl-$\beta$-chloro-trans-stilbene; 4-ethoxy-4'-n-butyl-$\alpha$-chloro-trans-stilbene; 4-ethoxy-2-methyl-4'-n-butyl-trans-stilbene; 4-acetoxy-4'-n-butyl-$\beta$-chloro-trans-stilbene; 4-methoxy-4'-n-octyl-$\beta$-chloro-trans-stilbene; 4-n-heptyloxy-4'-n-propyl-$\beta$-chloro-trans-stilbene; 4-methoxy-4'-n-butyl-$\beta$-chloro-trans-stilbene; 4-ethoxy-4'(3-methylbutyl)-$\beta$-chloro-trans-stilbene; 4-ethoxy-4'-n-butyl-$\beta$-chloro-trans-stilbene; 4-n-propoxy-4'-n-butyl-$\beta$-chloro-trans-stilbene; 4-ethoxy-4'-n-hexyl-$\beta$-chloro-trans-stilbene; 4-n-hexyloxy-4'-n-butyl-$\beta$-chloro-trans-stilbene; 4-ethoxy-4'-n-octyl-$\beta$-chloro-trans-stilbene; 4-ethoxy-4(2-methylpentyl)-$\beta$-chloro-trans-stilbene; 4-n-butoxy-4'-n-butyl-$\beta$-chloro-trans-stilbene; 4-ethoxy-4'(2-methylhexyl)-$\beta$-chloro-trans-stilbene; 4-ethoxy-4'(2-methylbutyl)-$\beta$-chloro-trans-stilbene; 4-butyl-4'-n-octyl-$\beta$-chloro-trans-stilbene; 4-cyano-4'-n-butyl-$\beta$-chloro-trans-stilbene; trans-4-butyl-$\alpha$-chloro-4'-ethoxystilbene; trans-4-octyl-$\alpha$-chloro-4'-ethoxystilbene; 4,4'-dimethoxystilbene.

Layer 7 of nematic liquid crystalline composition comprising a trans-stilbene nematic liquid crystalline material preferably has a thickness in the range of about 1 to about 100 microns.

Radiation source 6 of ultraviolet radiation may comprise any suitable source of ultraviolet radiation. Typical suitable sources of ultraviolet radiation are commercially available such as, for example, D.C. xenon mercury lamps, available from Oriel Optics Corporation, 1 Market Street, Stamford, Connecticut; and mercury lamps such as model BH-6 high pressure, short arc mercury lamps available from General Electric Company; Lamp Business Division, Cleveland, Ohio.

Voltage source V can comprise any suitable source of D.C. or A.C. voltage. Trans-stilbene nematic liquid crystalline materials irradiated with ultraviolet radiation typically have a threshold level of voltage at or above which dynamic scattering is exhibited. The upper limit of voltage magnitude is typically governed by electrical breakdown of the imaging system. The threshold voltage at which trans-stilbene nematic liquid crystalline material irradiated with ultraviolet typically begin to exhibit dynamic scattering is within the range of from about 10 to about 50 volts. When employed to produce dynamic scattering, A.C. voltages are preferably of a frequency preferably up to about 100 Hz. Frequencies above about 100 Hz tend to reduce the movement of ions within the layer of liquid crystalline composition thereby diminishing the dynamic scattering effect.

In embodiments of the present invention where the dynamic scattering is provided with memory such as, for example, when the trans-stilbene nematic liquid crystalline material is mixed with a cholesteric liquid crystalline material, then A.C. voltages of magnitude greater than the imaging or dynamic scattering magnitude is employed at frequencies greater than 100 Hz in order to erase the stored dynamic scattering.

In imaging embodiments of the present invention the layer 7 of trans-stilbene nematic liquid crystalline composition is dynamically scattered in imagewise configuration. Generally speaking, this can be made to occur by any of the numerous imagewise address methods known in the art. For example, radiation source 6 of ultraviolet radiation may be passed through a stencil or mask and caused to impinge layer 7 in imagewise configuration, thereby decreasing the resistance of layer 7 in imagewise configuration sufficient to result in dynamic scattering in imagewise configuration. Other methods can be utilized where radiation source 6 uniformly impinges layer 7. These methods include, for example, utilizing a shaped electrode as at least one of the two electrodes employed, although, of course, both electrodes may be shaped in imagewise configuration. Another method employing uniform irradiation from source 6 includes the addition of a photoconductive layer between one of the electrodes and the layer 7 of trans-stilbene nematic liquid crystalline material.

Figure 2:
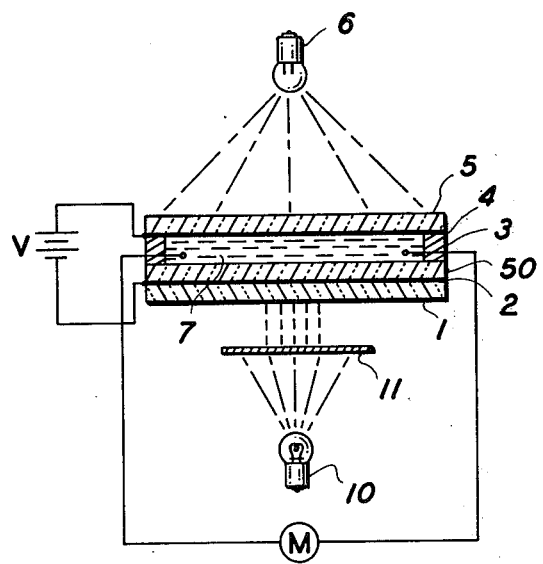
FIG. 2 is a schematic illustration of another embodiment of the invention.

This can be found in FIG. 2, wherein like numerals refer to like elements found in FIG. 1. In FIG. 2, layer 50 of photoconductive material is shown positioned between conductive coating 2 and layer 7 of trans-stilbene nematic liquid crystalline composition. Radiation source 10 is a source of radiation which is actinic to the photoconductive material in layer 50. Stencil or mask 11 is positioned intermediate radiation source 10 and layer 50 of photoconductive material and allows only imagewise configured actinic radiation to impinge layer 50.

In the embodiment of FIG. 2, layer 50 of photoconductive material may comprise any suitable photoconductive material. Typical suitable photoconductive materials include photoconductive inorganic materials and photoconductive organic materials. Typical suitable inorganic photoconductive materials include sensitized zinc oxide, for example, sensitized by the addition of Rhodamine Dye, available from Dupont, selenium, selenium alloyed with arsenic such as, for example, arsenic triselenide, selenium alloyed with tellurium, antimony or bismuth; cadmium sulfide, cadmium sulfoselenide, and the many other typical suitable inorganic photoconductive materials listed in U.S. Pat. No. 3,121,006 to Middleton et al and listed in U.S. Pat. No. 3,288,603, both of which are hereby incorporated by reference. Typical suitable organic photoconductive materials include, for example, a combination of 2-5-bis(p-aminophenyl)-1,3,4-oxadiazole available under the trademark TO 1920 from Kalle and Company, Weisbaden-Biebrich, Germany and Vinylite VYNS, a copolymer of vinylchloride and vinyl acetate available from Carbide and Carbon Chemicals Co.; and the combination of 2,4,7-trinitro-9-fluorenone to polyvinyl carbazole, available under the trademark Luvican 170 from Winter, Wolf and Co., New York, New York. The thickness of the photoconductive layer is not critical to the practice of the present invention and any thickness which provides a sufficiently high dark resistance may be utilized.

That is, the dark resistance should be sufficient to provide greater voltage across the photoconductive layer than across the liquid crystalline layer in the dark. When struck by actinic radiation, the voltage decreases across the photoconductive layer and increases across the liquid crystalline layer.

It will be appreciated that photoconductors having a fundamental absorption band within the electromagnetic spectrum, including the visible region, the X-ray region, the infrared region, etc., can be employed. Preferably, the photoconductive materials employed in the present invention do not have a fundamental absorption band within the ultraviolet region so that the irradiation of layer 7 of liquid crystalline composition by the radiation source 6 is not actinic to the layer 50 of photoconductive material. The radiation source 10 utilized will, of course, provide radiation which is actinic to the photoconductor employed.

In summary, the embodiment depicted in FIG. 2 provides a system wherein the electrical resistivity of layer 7 of liquid crystalline composition is uniformly decreased by ultraviolet radiation and wherein a voltage is applied in imagewise configuration utilizing an optical input from radiation source 10 to render layer 50 of photoconductive material conductive in imagewise configuration.

Other means of applying a voltage across layer 7 in imagewise configuration which will allow the uniform impingement of layer 7 of liquid crystalline composition with ultraviolet radiation are well known to those skilled in the art. These include X-Y address systems, bit matrices and numerous other electro-optic cell configurations.

In accordance with the practice of the present invention, the important effect sought is the lowering of electrical resistivity of layer 7 of trans-stilbene nematic liquid crystalline composition to a degree sufficient to allow dynamic scattering of layer 7 under applied voltage. Accordingly, the degree to which the electrical resistivity is reduced depends on the identity of the trans-stilbene and the voltage magnitude employed. Typical suitable electrical resistivities for trans-stilbenes at which dynamic scattering occurs are within the range from about $2 \times 10^{11}$ to $4 \times 10^8$ ohms-cm.

The following examples further specifically illustrate various preferred embodiments of the present invention. Parts and percentages are by weight unless otherwise indicated.

EXAMPLE I

An imaging member according to FIG. 1 is prepared as follows: substrates 1 and 5 comprise glass slides of the type typically employed in microscopic examination. Conductive coatings 2 and 4 comprise indium oxide; spacer 3 is an about ½ mil thick Mylar spacer, a polyethylene terephthalate available from Dupont; and layer 7 of liquid crystalline composition comprises about 65% by weight of trans-4-butyl-α-chloro-4'-ethoxystilbene and about 35% by weight cholesteryl oleyl carbonate. A 200 watt Hanovia 901 B 1 xenon mercury lamp available from Oriel Optics Corporation is positioned about 5 inches from the liquid crystalline composition. The xenon mercury lamp is activated and radiation therefrom strikes the layer of liquid crystalline composition until the electrical resistivity of the composition is about $2 \times 10^{11}$ ohms/cm. A D.C. voltage source is electrically connected to the indium oxide coating and provides a D.C. voltage of about 50 volts. Layer 7 of liquid crystalline composition substantially uniformly exhibits dynamic scattering.

EXAMPLE II

Example I is followed except that the xenon mercury lamp is not activated. Upon application of about 50 volts D.C., the layer of liquid crystalline composition does not exhibit dynamic scattering.

EXAMPLE III

Example I is repeated with the exception that the ultraviolet radiation first passes through a stencil prior to impinging the layer of liquid crystalline composition. Upon application of 50 D.C. volts, the layer of liquid crystalline composition dynamically scatters in imagewise configuration.

EXAMPLE IV

The imaging system of FIG. 2 is provided by following the procedures of Example I with the addition of: vacuum evaporation of an about 8 micron thick layer of arsenic triselenide onto the indium oxide coating of one of the substrates; the provisioning of a monochromator tuned to provide radiation at a wavelength of about 4540A and positioned to provide within about 1 sec a total incident flux of about $2.4 \times 10^{12}$ photons/cm$^2$; and, a stencil is positioned between the monochromator and the layer of arsenic triselenide. With the 50 D.C. voltage applied, the layer of liquid crystalline composition is impinges with ultraviolet radiation until the electrical resistivity of the composition reaches about $2 \times 10^{11}$ ohms-cm. The ultraviolet radiation is discontinued and the monochromator activated. Substantially immediately upon activation of the monochromator the layer of liquid crystalline composition dynamically scatters in imagewise configuration corresponding to the stencil image.

It will be appreciated that other variations and modifications will occur to those skilled in the art upon a reading of the present disclosure. These are intended to be within the scope of this invention.

For example, any of numerous cell electrode configurations that allow selective addressing of the liquid crystalline material may be utilized, such as the so-called matrix or cross-grid electrode configurations, where uniform irradiation with ultraviolet radiation is desired and where a non-optical input is to be provided. Additionally, the layer of liquid crystalline composition can be provided in imagewise configuration.

Further, the ultraviolet irradiation of trans-stilbenes can be employed to vary the resistivity of liquid crystalline compositions employed in the electro-optic art. For example, any of the highly resistive pure nematic trans-stilbenes can be added to the liquid crystalline compositions to provide a net resistivity of the resulting mixture that is of a different value than that of the liquid crystalline composition. The net resistivity of the resulting mixture can then be altered by irradiating the mixture with ultraviolet radiation.

We claim:
1. A method for dynamically scattering a pure liquid crystalline composition comprising a pure trans-stilbene material, comprising:
   a. providing between two electrodes, a layer of said liquid crystalline composition incapable of dynamically scattering when a voltage of predetermined magnitude is applied thereacross;
   b. irradiating said layer of liquid crystalline composition with ultraviolet radiation to increase the conductivity thereof sufficiently to cause dynamic scattering when said voltage of predetermined magnitude is applied thereacross; and
   c. applying said voltage of predetermined magnitude across said layer of liquid crystalline composition.
2. The method according to claim 1 wherein said liquid crystalline composition further comprises an optically active material.
3. The method according to claim 2 wherein said optically active material is a cholesteric liquid crystalline material.
4. The method according to claim 2 wherein said optically active material is a non-mesomorphic material.
5. The method according to claim 1 wherein said ultraviolet radiation is in imagewise configuration.
6. The method according to claim 1 wherein said voltage has a magnitude from about 10 to about 50 volts.
7. The method according to claim 6 wherein said voltage is an A.C. voltage at a frequency up to about 100 Hz.
8. The method according to claim 6 wherein said voltage is a D.C. voltage.
9. The method according to claim 1 wherein said voltage is applied in imagewise configuration.
10. The method according to claim 9 wherein at least one of said electrodes is provided in imagewise configuration.
11. The method according to claim 9 further including between one of said electrodes and said layer of liquid crystalline composition, a layer of photoconductive material; and further including in the performance of step (c) the step of irradiating said photoconductive material with actinic radiation in imagewise configuration.
12. The method according to claim 1 wherein said trans-stilbene is trans-4-butyl-α-chloro-4'-ethoxy stilbene.
13. The method according to claim 11 wherein said trans-stilbene is trans-4-butyl-α-chloro-4'ethoxy stilbene and wherein said photoconductive material comprises arsenic triselenide.
14. The method according to claim 1 wherein said layer of liquid crystalline composition is in imagewise configuration.
15. A method of imaging, comprising:
   a. providing between two electrodes a layer of liquid crystalline composition comprising a pure trans-stilbene nematic liquid crystalline material incapable of dynamically scattering when a voltage of predetermined magnitude is applied thereacross;
   b. irradiating said layer of liquid crystalline composition with ultra-violet radiation to increase the conductivity thereof sufficiently to cause dynamic scattering when said voltage of predetermined magnitude is applied thereacross; and c. applying said voltage of predetermined magnitude across said layer of liquid crystalline composition; one of said layer of liquid crystalline composition, said ultraviolet radiation and said applied voltage being provided in imagewise configuration.

16. The method according to claim 15 wherein said layer of liquid crystalline composition is provided in imagewise configuration.

17. The method according to claim 15 wherein said ultraviolet radiation is provided in imagewise configuration.

18. The method according to claim 15 wherein said applied voltage is provided in imagewise configuration.

19. The imaging method according to claim 18 wherein at least one of said electrodes is in imagewise configuration.

20. The imaging method according to claim 18 further including a layer of photoconductive material between one of said electrodes and said layer of liquid crystalline composition and further including in the performance of step (c) the step of irradiating said photoconductive material with actinic radiation in imagewise configuration.

21. The method according to claim 15 wherein said trans-stilbene is trans-4-butyl-$\alpha$-chloro-4'-ethoxy stilbene.

22. A method for varying the resistivity of liquid crystalline compositions, comprising:
   a. adding a pure trans-stilbene nematic liquid crystalline material to said liquid crystalline composition; and
   b. irradiating said liquid crystalline composition comprising said trans-stilbene material with ultraviolet radiation.

* * * * *